2,806,046
Patented Sept. 10, 1957

2,806,046
ALCOHOLIZING FATTY OILS WITH POLYHYDRIC TERTIARY ALCOHOLS

Roy W. Tess, Orinda, Calif., assignor to Shell Development Company, Emeryville, Calif., a corporation of Delaware No Drawing. Application October 12, 1953,
Serial No. 385,701

14 Claims. (Cl. 260—410.6)

This invention relates to an improved process for alcoholizing natural fatty oils with a polyhydric alcohol containing a tertiary alcohol group, and to the novel products having advantageous and unexpected properties obtainable thereby. More particularly, the invention is concerned with a method for alcoholizing castor oil with such a polyhydric alcohol, and to the product which is adapted as a base for use in hydraulic fluids.

Prior to the present invention, various glycols have been used as physical mixtures with castor oil in hydraulic fluids. It had also been found that by alcoholizing castor oil with a glycol such as propylene glycol or dipropylene glycol, there was obtained a mixed ester product which did not separate into component parts when subjected to low temperatures that are encountered at times in using hydraulic fluids containing the product in the winter, the arctic and at high altitudes. When I attempted to apply this principle of alcoholysis to reaction of castor oil with a polyhydric alcohol containing a tertiary alcohol group, it was found that the reaction was unduly slow for practical use. It was therefore a primary object of the present invention to develop a method for alcoholizing castor oil or other fatty oil with a polyhydric alcohol containing a tertiary alcohol group at a materially faster rate than was heretofore possible. This and other objects of the invention will be apparent from the following description.

I have now discovered that an improved rate of reaction is achieved by reacting a fatty oil with a polyhydric alcohol containing a tertiary alcohol group in the presence of an alcoholysis catalyst while azeotropically distilling water substantially as fast as formed from the reaction mixture with a water-entraining agent that is substantially immiscible with water and boils at a lower temperature than the polyhydric alcohol. I found that when such a polyhydric alcohol containing a tertiary alcohol group is heated in the presence of the alcoholysis catalyst, a small amount of water is formed by chemical dehydration or splitting out of water from the tertiary alcohol. This small amount of water from decomposition of the alcohol appears even though the initial mixture of reactants is anhydrous. Polyhydric alcohols having only primary and/or secondary alcohol groups are not subject to the dehydration reaction. The water that is formed in this manner from the tertiary alcohol adversely affects the rate of the desired alcoholysis reaction. By applying the improved method of my invention, the fault encountered with the polyhydric alcohols containing a tertiary carbon atom is overcome, and a rapid rate of reaction is achieved.

The reaction is usually effected by heating the reaction mixture in a vessel fitted with a distilling column which enables removal of water from the mixture as an azeotrope with the water-entraining agent. The distilling column is preferably fitted with a customary head for collection and separation of the distillate into an aqueous layer and an organic layer. The aqueous layer is withdrawn and discarded. The organic layer is returned to the column as reflux. The reaction mixture is heated, usually with stirring, to a temperature of about 130° C. to 250° C., preferably about 180° C. to 210° C.

Any of the natural fatty oils are suitable for use in the process of the invention. Reference is made to such representative oils as castor, soybean, linseed, coconut, cottonseed, olive, wool, perilla, pilchard, whale, menhaden, peanut, dehydrated castor, tung, safflower, oiticica, herring, fish, poppy seed, sardine, walnut and the like as well as hydrogenated unsaturated fatty oils such as obtained from hydrogenating coconut, cottonseed, and other oils. The esters in all of such typical oils are primarily triglycerides. Mixtures of oils may be used if desired.

The advantages of the invention are achieved with any of the polyhydric alcohols containing a tertiary alcohol group such as, for example, 2-methyl-1,2-propanediol, 2-methyl-1,2-butanediol, 2-methyl-2,3-butanediol, 2-methyl-2,4-butanediol, 2-methyl-2,3-pentanediol, 2-methyl-2,4-pentanediol, 2-methyl-2,5-pentanediol, 3-ethyl-3,4-butanediol, 2,3-dimethyl-2,3-butanediol, 2-methyl-2,6-hexanediol, 2,4-dimethyl-2,3-pentanediol, 2-methyl-2,6-heptanediol, 2-methyl-2,3,4-butanetriol, 2-methyl-2,4,5-pentanetriol, 2,4-dimethyl-2,3,4-pentanetriol, 2,5-dimethyl-2,3,4 - hexanetriol, 2,6-dimethyl-2,3,8-octanetriol, 2,5-dimethyl-1,2,5,6-hexanetetrol, 2,5-dimethyl-2,3,4,5-hexanetetrol, 1-methylol-1-cyclopentanol, 1-methylol-1-cyclohexanol, 1-methyl-1,2-cyclopentanediol, 2-methyl-1-phenyl-1,2- propane - diol, 2-methyl-1-phenyl-1,2-butanediol, 2-methyl-4-phenyl-2,3-butanediol, and the like. It is preferred that the polyhydric alcohol contain in addition to the tertiary alcohol group, at least one primary or secondary alcohol group, i. e., an alcoholic hydroxyl group that is linked directly to a saturated carbon atom also having at least one hydrogen atom linked directly thereto. The most preferred reactant is 2-methyl-2,4-pentanediol. This compound is available commercially from a synthesis involving condensation of acetone to diacetone alcohol followed by hydrogenation of the product to the diol. Mixtures of different polyhydric alcohols may be used if desired.

The reaction is effected with the reactants in the presence of one or more of the well known alcoholysis catalysts such as, for example, sodium hydroxide, potassium hydroxide, calcium oxide, barium hydroxide, sodium acetate, sodium ricinoleate, lithium carbonate, lead oxide, triethanolamine, and sodium or potassium alcoholates including sodium methylate, sodium ethylate and sodium alcoholates of the polyhydric alcohol employed as reactant. The amount of catalyst used is, in general, from about 0.01 to 2 or more percent by weight of the reaction mixture. Although there is some increase in the rate of reaction with larger proportions of catalyst, it is usually preferred to employ about 0.1 to 0.5 percent.

In order that the reaction mixture will be maintained in an anhydrous condition during the reaction, the water is distilled therefrom as an azeotrope with a volatile water-entraining agent that is substantially water immiscible and which boils lower than polyhydric alcohol used as reactant. Although there are a great many substances suitable for this purpose, it is usually preferred to employ benzene. Other water-entraining agents which may be used if desired include such representative substances as toluene, xylene, hexane, isooctane, petroleum naphtha, ethylene dichloride, dichlorodiethyl ether, diisopropyl ether and the like. The amount of water-entraining agent may vary considerably, but its proportion is usually kept small such as 0.1 to 2 percent by weight of the reaction mixture. The use of such a small proportion is advantageous because the inert agent tends to be kept in the head and upper portion of the distilling column during the course of the reaction, and thus, the reaction mixture is easily maintained at the relatively high temperature usually desired. Upon completion of the desired extent of reaction, the water-entraining agent may be separated from the reaction mixture by distillation.

Although not necessary, it is customary to use more than 1 mol of the polyhydric alcohol per mol of the natural oil in the starting mixture of reactants. In fact, when the process of the invention is employed to prepare a product adapted for use as a base for a hydraulic fluid by subjecting castor oil to alcoholysis with the polyhydric alcohol, it is advantageous to use a starting mixture containing about 2 to 10 mols of polyhydric alcohol per mol of oil since unreacted alcohol is a desirable constituent of the hydraulic fluid. Thus, in producing a base by alcoholizing castor oil with 2-methyl-2,4-pentanediol, equal weights of oil and diol comprise a suitable mixture. Such a mixture contains about 7.9 mols of diol per mol of oil. Such excesses of polyhydric alcohol are also advantageous in alcoholizing other oils.

In executing the process, the heating is continued until the desired extent of reaction is attained. Several hours of reaction time are usually used. Although the product is a complex mixture of esters of glycerol and the polyhydric alcohol with the fatty acids of the oil, the first products may be considered to be the diglyceride from the oil and the mono-ester of the polyhydric alcohol with the oil fatty acid. Continued alcoholysis gives the monoglyceride and finally some free glycerine. The extent of reaction may be followed by chemical or other methods of analysis, a particularly suitable procedure being described in the examples given hereinafter. In general, it is preferred that the reaction be continued until at least 50% of the oil has been alcoholized.

The products of the invention are very useful materials having advantageous properties. Unlike the products formed by reacting a fatty oil with a polyhydric alcohol devoid of a tertiary alcohol group, the products of the present invention have materially lower viscosities at reduced temperature than the viscosity of a corresponding unreacted mixture of the starting components. This unexpected property is valuable in using the products under low temperature conditions for transmission of power and the like.

The products derived from castor oil are particularly useful as bases in hydraulic fluids utilized in machinery for transmission of power such as brake mechanisms, shock absorbers, artillery recoil mechanisms, door checks and the like. In using the castor oil products in hydraulic fluids, the formed esters (aside from unreacted polyhydric alcohol which may be present) normally constitute a minor proportion of the fluid. The remainder of the fluid may be the polyhydric alcohol and/or other polyhydric alcohol as well as one or more monohydric alcohols such as isopropyl alcohol, normal butyl alcohol, secondary butyl alcohol, and/or methyl or butyl monoethers of ethylene, diethylene, propylene and dipropylene glycols. Thus, an excellent hydraulic fluid is made by subjecting equal weights of castor oil and 2-methyl-2,4-pentanediol to alcoholysis according to the method of the invention until about 70% diglyceride is formed, and then mixing together about 25 to 35% by volume of this base with 25 to 35% of 2-methyl-2,4-pentanediol, 0 to 10% of isopropyl alcohol, and 20 to 40% of secondary butyl alcohol. As customary, the hydraulic fluids also contain anti-oxidants such as hydroquinone, anti-corrosion agents such as diamylamine phosphate, and agents to neutralize excessive acidity.

There are various other uses for the products of the invention. Alkyd resins may be prepared by reacting the products with polycarboxylic acids or anhydrides such as phthalic anhydride. Highly alcoholized products are suitable for use as dispersing and emulsifying agents.

The invention is illustrated by the following examples which are not to be construed as limiting the scope of the invention to details described therein.

Example I

For purposes of comparison, two parallel tests were made in the alcoholysis of castor oil with 2-methyl-2,4-pentanediol using calcium oxide as alcoholysis catalyst. In one test, benzene was employed as azeotroping agent, and in the other, no benzene was used. Dry 2-methyl-2,4-pentanediol was employed in the tests. It was prepared by adding a small amount of toluene to the glycol, then distilling the toluene from the glycol with use of a kettle temperature up to about 185° C., and discarding the first distillate.

To a reaction vessel equipped with a stirrer and a distilling column fitted with a head permitting separation of condensed distillate into an organic layer which was returned as reflux and an aqueous layer which was withdrawn, there were added equal weights of castor oil and dry 2-methyl-2,4-pentanediol along with about an added 0.15% by weight of calcium oxide as catalyst and about an added 0.7% of benzene as water azeotroping agent. The reaction mixture was heated with stirring to about 194° C. at which kettle temperature there was gentle refluxing in the head which was at a temperature of about 78° C. At the time intervals listed in the table below, small samples of the reaction mixture were withdrawn for determination of the extent of alcoholysis.

The determination was made by adding about 1.5 grams of sample to a tared aluminum-foil milk-bottle cap and then weighing the whole. The sample was then heated for 3 hours at 210° F. whereby the glycol evaporates completely without significant loss of castor oil or its alcoholysis products which remain as residue and are weighed. Experience had shown that this method gave a much more accurate determination of the extent of alcoholysis than conventional chemical analysis for glycerol, glycol, and ester using saponification and hydroxyl value determinations. Considering the alcoholysis product to be the diglyceride of castor oil, the extent of reaction is then expressed as follows:

$$\text{Percent castor oil reacted} = \frac{(B-A) \times 100}{C-A}$$

wherein A is the percent of solids at the start which is 50.0% with the mixture of equal weights of castor oil and glycol, B is the percent of solids or residue remaining after evaporation of the glycol from the sample, and C is the percent of solids at 100% reaction which with the use of 2-methyl-2,4-pentanediol and castor oil is 56.3%.

The results in the test using benzene are tabulated below.

The parallel test also used equal weights of castor oil and dry 2-methyl-2,4-pentanediol containing an added 0.15% by weight of calcium oxide as catalyst, but no benzene or other azeotroping agent was present. The temperature of the reaction mixture was maintained at 190° C. which caused gentle refluxing. Samples were again withdrawn at intervals with determinations being made of the extent of alcoholysis. The results are tabulated below:

| Hours of Time From Start | Percent Oil Converted to Diglyceride | |
| --- | --- | --- |
| | With Benzene | Without Benzene |
| 1 | 35 | 17 |
| 2 | 67 | 32 |
| 4 | 87 | 49 |
| 8 | 102 | 60 |
| 24 | 103 | 79 |

The foregoing results demonstrate the faster and more complete reaction obtained with use of the benzene.

This is especially true in the early stages of the reaction. The values of greater than 100%—i. e., 102 and 103%, appear because there is a small amount of alcoholysis to the monoglyceride, and also possibly to free glycerol, but there is no accurate method for determining such products in the mixture. Nevertheless, the method of determination gives consistent relative values although they may not be absolute values.

Example II

The alcoholized product prepared using benzene as described in Example I was used as a base for a hydraulic fluid. Mixtures were prepared containing 40% by weight of base and 60% of methyl isobutyl carbinol (2-methyl-4-pentanol) for measurement of viscosity characteristics. By way of comparison, there was also prepared a base by alcoholizing a mixture of equal weights of castor oil and propylene glycol containing an added 0.15% by weight of calcium oxide catalyst. The alcoholysis was conducted at 190° C. as described with the second test in Example I. Owing to the much faster rate of reaction with propylene glycol, the alcoholysis was discontinued after 4 hours when 172% of the oil had been converted to diglyceride. The product was also compounded into a mixture of 40% base and 60% methyl isobutyl carbinol for viscosity measurements. In addition, other mixtures of unreacted components were prepared for purposes of comparison which contained by weight 20% of 2-methyl-2,4-pentanediol or propylene glycol, 20% castor oil and 60% of methyl isobutyl carbinol. The viscosities of the mixtures at the low temperature of −40° F. were determined and the following results were obtained. For brevity in the table, 2-methyl-2,4-pentanediol is labelled as hexylene glycol.

| Glycol | Alcoholysis Used | Benzene Used | Percent Conversion | Viscosity in Centistokes at −40° F. |
|---|---|---|---|---|
| Hexylene | No | No | 0 | 2,226 |
| Hexylene | Yes | Yes | 106 | 1,722 |
| Propylene | No | No | 0 | 2,230 |
| Propylene | Yes | No | 172 | 2,260 |

The foregoing results demonstrate the unexpected and advantageous property possessed by the product of the invention. It will be observed that even though there was 172% of the oil converted with the propylene glycol, the hydraulic fluid containing this base had about the same viscosity at −40° F. as the physical mixture of identical components not subjected to alcoholysis. On the other hand, the base which was made using 2-methyl-2,4-pentanediol and benzene had a much lower viscosity of only 1722 centistokes at −40° F. as compared with the viscosity of 2226 centistokes of the physical mixture.

Example III

Sodium methylate was used as catalyst in the alcoholysis of castor oil with 2-methyl-2,4-pentanediol while employing benzene as water azeotroping agent. Again, a mixture of equal weights of castor oil and the glycol containing about 0.15% by weight of catalyst and 0.7% by weight of benzene was used. The reaction temperature was about 190° C. The results are given in the table below.

A parallel test was again made using no benzene. The results with this test are also given below:

| Hours of Time From Start | Percent Oil Converted to Diglyceride | |
|---|---|---|
| | With Benzene | Without Benzene |
| 1 | 52 | 35 |
| 2 | | 44 |
| | 87 | 49 |
| 4 | 89 | 60 |
| 8 | 106 | 71 |
| 24 | | |

Example IV

A hydraulic fluid was prepared from the product of Example III using 40% by weight of the base and 60% of methyl isobutyl carbinol. It was found that the fluid had a viscosity of 1500 centistokes at −40° F. compared to a viscosity of 2226 centistokes for the physical mixture of unreacted components.

Example V

Castor oil was alcoholized with use of an equal weight of 2-methyl-2,4-pentanediol, 0.15% sodium methylate as catalyst, and benzene as water-entraining agent as described in Example III except that the reaction was discontinued after only 2 hours heating. Analysis of this product indicated that about 58% of the castor oil had been converted to the diglyceride. The product was used as a base in two hydraulic fluid formulations given below wherein it is identified as Base I. The performance of Base I in the hydraulic fluids was compared with a product which was typical of those known prior to my invention and is herein identified as Base A. Base A was a product obtained by subjecting about equal weights of castor oil and a mixture of glycols consisting of about 15% propylene glycol and 85% dipropylene glycol containing a little tripropylene glycol to alcoholysis until about 75% of the castor oil was converted to diglyceride. One of the ingredients of the hydraulic fluids was Dowanol 93B-2 from the Dow Chemical Company, which was a mixture of monomethyl ethers of propylene glycol, dipropylene glycol and tripropylene glycol having a 5–95% boiling range of about 129–294° C., a specific gravity at 25/25 of 0.944 and a refractive index (D/25) of 1.416.

The hydraulic fluids were prepared containing the compositions in percent by volume tabulated below, and the viscosity at −40° F. of each was measured. In this connection, it is to be noted that the S. A. E. specification for heavy duty hydraulic fluid is a maximum of no more than 1800 centistokes at −40° F.

| Hydraulic Fluid | 1 | 2 | 3 | 4 |
|---|---|---|---|---|
| Component: | | | | |
| Base I | 40 | | 40 | |
| Base A | | 40 | | 40 |
| 2-Methyl-2,4-Pentanediol | 7 | 7 | | |
| Methyl Isobutyl Carbinol | 13 | 13 | 7 | 7 |
| Dowanol 93B-2 | 40 | 40 | 53 | 53 |
| Viscosity in Centistokes at −40° F. | 1,680 | 2,620 | 1,600 | 2,345 |

I claim as my invention:

1. A process for obtaining a modified ester product from a fatty oil which comprises alcoholizing the oil with a polyhydric alcohol containing a tertiary alcohol group in the presence of an alcoholysis catalyst while azeotropically distilling water from the reaction mixture with a water-entraining agent that is substantially immiscible with water and boils at a lower temperature than said polyhydric alcohol whereby the water formed by chemical dehydration of the polyhydric alcohol is removed from the reaction mixture and the rate of alcoholysis is thereby increased.

2. The modified ester product obtained by the process defined in claim 1 which comprises a complex mixture including the polyhydric alcohol, diglyceride of the fatty oil and ester of the polyhydric alcohol with fatty acid of the fatty oil, said complex mixture being prepared from the reaction of about 1 to about 10 moles of the polyhydric alcohol per mole of the oil at temperatures ranging from about 130° C. to 250° C. in the presence of the alcoholysis catalyst.

3. A process for obtaining a modified ester product from castor oil which comprises alcoholizing the oil with a polyhydric alcohol containing a tertiary alcohol group in the presence of an alcoholysis catalyst while azeotropically distilling water from the reaction mixture with a water-entraining agent that is substantially immiscible with water and boils at a lower temperature than said polyhydric alcohol whereby the water formed by chemical dehydration of the polyhydric alcohol is removed from the reaction mixture and the rate of alcoholysis is thereby increased.

4. The modified ester product obtained by the process defined in claim 3 which comprises a complex mixture including the polyhydric alcohol, diglyceride of the fatty oil and ester of the polyhydric alcohol with fatty acid of the fatty oil, said complex mixture being prepared from the reaction of about 1 to about 10 moles of the polyhydric alcohol per mole of the oil at temperatures ranging from about 130° C. to 250° C. in the presence of the alcoholysis catalyst.

5. A process for obtaining a modified ester product from castor oil which comprises alcoholizing the oil with 2-methyl-2,4-pentanediol in the presence of an alcoholizing catalyst while azeotropically distilling water from the reaction mixture with a water-entraining agent that is substantially immiscible with water and boils at a lower temperature than said diol whereby the water formed by chemical dehydration of the polyhydric alcohol is removed from the reaction mixture and the rate of alcoholysis is thereby increased.

6. The modified ester product obtained by the process defined in claim 5 which comprises a complex mixture including the polyhydric alcohol, diglyceride of the fatty oil and ester of the polyhydric alcohol with fatty acid of the fatty oil, said complex mixture being prepared from the reaction of about 1 to about 10 moles of the polyhydric alcohol per mole of the oil at temperatures ranging from about 130° C. to 250° C. in the presence of the alcoholysis catalyst.

7. A process for obtaining a modified ester product from castor oil which comprises heating and reacting a mixture of the oil and 2-methyl-2,4-pentanediol containing a molar excess of the diol in the presence of an added 0.01 to 2% by weight of sodium methylate as alcoholysis catalyst while azeotropically distilling water from the reaction mixture with benzene until at least 50% of the oil has been alcoholized whereby the water formed by chemical dehydration of the polyhydric alcohol is removed from the reaction mixture and the rate of alcoholysis is thereby increased.

8. A process for obtaining a modified ester product from castor oil which comprises heating and reacting a mixture of the oil and 2-methyl-2,4-pentanediol containing a molar excess of the diol in the presence of an added 0.01 to 2% by weight of calcium oxide as alcoholysis catalyst while azeotropically distilling water from the reaction mixture with benzene until at least 50% of the oil has been alcoholized whereby the water formed by chemical dehydration of the polyhydric alcohol is removed from the reaction mixture and the rate of alcoholysis is thereby increased.

9. A process for obtaining a modified ester product from castor oil which comprises alcoholizing the oil with 2-methyl-1,2-propanediol in the presence of an alcoholizing catalyst while azeotropically distilling water from the reaction mixture with a water-entraining agent that is substantially immiscible with water and boils at a lower temperature than said diol whereby the water formed by chemical dehydration of the polyhydric alcohol is removed from the reaction mixture and the rate of alcoholysis is thereby increased.

10. The modified ester product obtained by the process defined in claim 9 which comprises a complex mixture including the polyhydric alcohol, diglyceride of the fatty oil and ester of the polyhydric alcohol with fatty acid of the fatty oil, said complex mixture being prepared from the reaction of about 1 to about 10 moles of the polyhydric alcohol per mole of the oil at temperatures ranging from about 130° C. to 250° C. in the presence of the alcoholysis catalyst.

11. A process for obtaining a modified ester product from linseed oil which comprises alcoholizing the oil with 2-methyl-2,4-pentanediol in the presence of an alcoholizing catalyst while azeotropically distilling water from the reaction mixture with water-entraining agent that is substantially immiscible with water and boils at a lower temperature than said diol whereby the water formed by chemical dehydration of the polyhydric alcohol is removed from the reaction mixture and the rate of alcoholysis is thereby increased.

12. The modified ester product obtained by the process defined by claim 11 which comprises a complex mixture including the polyhydric alcohol, diglyceride of the fatty oil and ester of the polyhydric alcohol with fatty acid of the fatty oil, said complex mixture being prepared from the reaction of about 1 to about 10 moles of the polyhydric alcohol per mole of the oil at temperatures ranging from about 130° C. to 250° C. in the presence of the alcoholysis catalyst.

13. A process for obtaining a modified ester product from coconut oil which comprises alcoholizing the oil with 2-methyl-2,4-pentanediol in the presence of an alcoholizing catalyst while azeotropically distilling water from the reaction mixture with a water-entraining agent that is substantially immiscible with water and boils at a lower temperature than said diol whereby the water formed by chemical dehydration of the polyhydric alcohol is removed from the reaction mixture and the rate of alcoholysis is thereby increased.

14. The modified ester product obtained by the process defined by claim 13 which comprises a complex mixture including the polyhydric alcohol, diglyceride of the fatty oil and ester of the polyhydric alcohol with fatty acid of the fatty oil, said complex mixture being prepared from the reaction of about 1 to about 10 moles of the polyhydric alcohol per mole of the oil at temperatures ranging from about 130° C. to 250° C. in the presence of the alcoholysis catalyst.

References Cited in the file of this patent

UNITED STATES PATENTS

| | | |
|---|---|---|
| 2,481,278 | Ballard et al. | Sept. 6, 1949 |
| 2,497,968 | Young et al. | Feb. 21, 1950 |
| 2,553,288 | Young et al. | May 15, 1951 |
| 2,585,884 | Whetstone et al. | Feb. 12, 1952 |

OTHER REFERENCES

Groggins: Unit Processes in Organic Synthesis, 3rd ed. (1947), McGraw-Hill Book Co., N. Y. C., pages 627–629.